United States Patent
Bruno

(10) Patent No.: US 7,692,398 B2
(45) Date of Patent: Apr. 6, 2010

(54) ACTUATOR FOR OPERATING A ROLLER BLIND AND METHOD OF OPERATING SUCH AN ACTUATOR

(75) Inventor: Serge Bruno, Marnaz (FR)

(73) Assignee: SOMFY SAS, Cluses (FR)

( * ) Notice: Subject to any disclaimer, the term of this patent is extended or adjusted under 35 U.S.C. 154(b) by 959 days.

(21) Appl. No.: 11/439,787

(22) Filed: May 24, 2006

(65) Prior Publication Data

US 2006/0284590 A1 Dec. 21, 2006

(30) Foreign Application Priority Data

Jun. 1, 2005 (FR) ................................. 05 05559

(51) Int. Cl.
*H02P 1/44* (2006.01)
(52) U.S. Cl. .................. 318/751; 318/816; 318/817
(58) Field of Classification Search ................ 318/565, 318/727, 739, 747–756, 816, 817; 388/909
See application file for complete search history.

(56) References Cited

U.S. PATENT DOCUMENTS

| 3,643,142 | A | * | 2/1972 | McBride, Jr. ................ 318/788 |
| 3,683,250 | A | * | 8/1972 | Fricker ........................ 318/788 |
| 4,200,829 | A | * | 4/1980 | Pohl ............................ 318/782 |
| 5,539,295 | A | * | 7/1996 | Utsumi et al. ................ 318/791 |
| 6,366,153 | B1 | * | 4/2002 | Arslain et al. ................ 327/512 |
| 6,982,539 | B1 | * | 1/2006 | Ward ........................... 318/778 |
| 7,081,728 | B2 | * | 7/2006 | Kemp .......................... 318/437 |
| 2005/0237692 | A1 | * | 10/2005 | Grehant ...................... 361/152 |
| 2007/0279070 | A1 | * | 12/2007 | Moindron .................... 324/522 |

FOREIGN PATENT DOCUMENTS

| EP | 1 186 741 A | 3/2002 |
| WO | WO 2004/109903 A | 12/2004 |

* cited by examiner

*Primary Examiner*—Bentsu Ro
(74) *Attorney, Agent, or Firm*—Frommer Lawrence & Haug LLP; Ronald R. Santucci

(57) ABSTRACT

The actuator (ACT) is intended to be linked to phase (AC-H) and neutral (AC-N) conductors. It comprises a motor (MOT) provided with windings (W1, W1), a capacitor (CM) disposed between two ends of the windings and the terminals of which form a first (P1) and a second (P2) phase terminal. It includes a switch (TR) controlled by an electronic unit (CPU) to link the common end of the windings to the neutral conductor, at least one pair of diodes (D1, D2; D3, D4), the diodes of one and the same pair being connected by an electrode of the same type to a resistive circuit (RA, RB, RC, DZ1, DZ2) connected to the neutral conductor, the other electrode of each diode being respectively linked to the first and second phase terminals and means (CS1, CS2) of detecting the state of conduction of the diodes.

15 Claims, 7 Drawing Sheets

ACTUATOR FOR OPERATING A ROLLER BLIND AND METHOD OF OPERATING SUCH AN ACTUATOR

This application claims priority benefits from French Patent Application No.05 05559 filed Jun. 1, 2005.

The invention relates to an actuator defined by the preamble to claim 8. It also relates to a method of operating such an actuator.

The actuator is intended to drive a moving load in a building, such as a closure or solar protection device, a projection screen or similar.

BACKGROUND OF THE INVENTION

A single-phase induction motor comprises a first winding and a second winding, these two windings presenting a common point linking one end of each winding. The other end of the first winding is linked to the first phase terminal and the other end of the second winding is linked to the second phase terminal. A motor capacitor CM is disposed between these two other ends. Thus, depending on whether a voltage is applied between the first phase terminal and the common point or between the second phase terminal and the common point, either the capacitor is placed in series with the second winding and the motor rotates in a first direction, or the capacitor is placed in series with the first winding and the motor rotates in a second direction. The winding that is in series with the capacitor is qualified as auxiliary and the other is then qualified as main.

A first problem arises with such an actuator when it comprises a single controlled switch, the latter being disposed on the neutral conductor and being used in particular to automatically cut off the motor power supply when an obstacle is detected or when a particular position is reached. In practice, when this switch is open, the voltage at the terminals of the motor capacitor is zero since no current is flowing in the auxiliary winding. The second phase terminal then takes a potential equal to that of the first phase terminal when the switch controlling the motor links the phase of the mains to the first terminal P1. It is therefore not possible to identify the nature of the control command applied.

This can seem to have no effect: however, when the controlled switch is closed, the motor necessarily rotates in the direction imposed by the position of the control switch. In practice, if the motor is fitted with a load detection system (for example, by analyzing the motor torque), it is important for the control electronics of the motor to recognize the control command applied in order to choose accordingly the control thresholds or algorithms. In practice, these thresholds or algorithms can differ depending on whether the load is driven (for example, the raising of a roller blind) or driving (for example, the lowering of a roller blind).

A second problem arises when this controlled switch is closed: when the motor is powered in a direction, it is essential to be able to identify an abrupt operation of the control switch from the first position to the second position. Such a reversal of the power supply leads to both a major overcurrent and a mechanical jolt provoking premature wear of the components.

DESCRIPTION OF THE PRIOR ART

These problems are in particular discussed in the patent application WO 2004/109903. The proposed solution is to use a phase shift measurement to identify a slight phase difference between the potentials of the first and second phase conductors. The assembly uses not only resistors for lowering the voltage applied to the microcontroller but also capacitors that must support the mains voltage. Such capacitors are expensive. Despite this cost overhead, the assembly described is interesting in the case where a measurement of voltage phase shift is used to monitor the load of the motor, since the components then have a dual function. However, as described below, such a method is less accurate than a measurement of the voltage at the terminals of the motor capacitor.

A third problem relates to the indirect measurement of the torque of the actuator motor on the moving load. It is for example known from patent application FR 2 770 699 to measure this torque indirectly, or the variations of this torque, using the terminal voltage of the motor capacitor, or better by various combinations of the main winding terminal voltage and the auxiliary winding terminal voltage. In all cases, it is necessary to be able to identify in a simple way the accurate instant when a measurement will give the amplitude of one or the other of these voltages, or a combination of these voltages allowing an indirect measurement of the torque or of its variations.

SUMMARY OF THE INVENTION

The purpose of the invention is to provide an actuator and a method of operating an actuator that overcome the above-mentioned problems and improve the actuators and methods known from the prior art. In particular, the actuator and the method according to the invention make it possible, in a simple way, to identify the control commands even when the controlled switch used to power the motor is open. They also make it possible to detect an abrupt operation of the control switch.

Moreover, the invention makes it possible to identify in a simple way the instants when a voltage measurement gives the amplitude of one of the voltages, for example the terminal voltage of the motor capacitor, or the terminal voltage of one of the windings. The invention allows in particular a direct measurement of a quantity directly equal or proportional to the difference of the terminal voltages of the motor capacitor and of the main winding.

The actuator according to the invention is characterized by the characterizing part of claim 8.

Different embodiments of the actuator are defined by the dependent claims 9 to 13.

The method of operation according to the invention is defined by claim 1.

Different ways of executing the method according to the invention are defined by the dependent claims 2 to 7.

The invention also relates to a measuring method defined by claim 14.

The invention also relates to an actuator defined by claim 15.

DESCRIPTION OF THE DRAWINGS

The appended drawing represents, in the form of examples, different embodiments of a device according to the invention.

DESCRIPTION OF THE PREFERRED EMBODIMENTS

Figure 1:
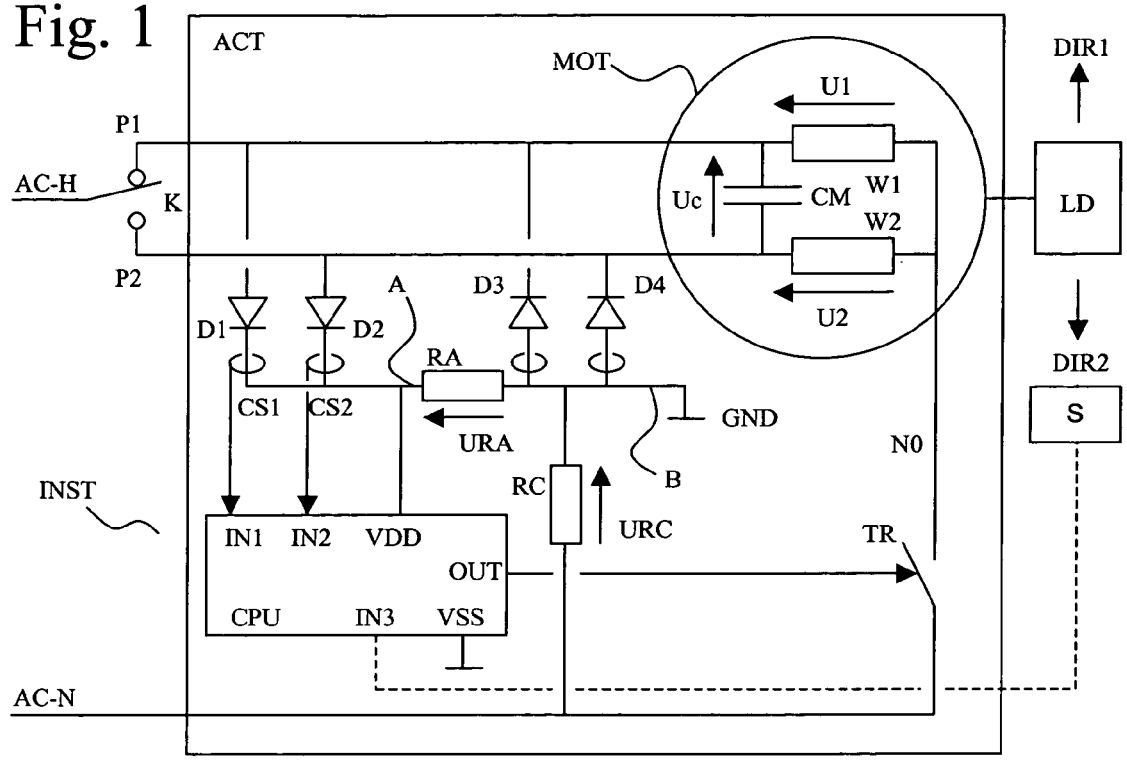
FIG. 1 is a diagram of a first embodiment of an actuator device according to the invention.

FIG. 1 describes an installation INST comprising an actuator ACT according to the invention. The actuator ACT is connected to the commercial alternating current network (for example, 230 V-50 Hz) by a permanent link with the neutral conductor of the network AC-N and by means of a three-position reversing switch K enabling a first phase terminal P1 or a second phase terminal P2 to be connected to the phase conductor of the network AC-H. In the third position, the reversing switch K establishes no connection with the phase terminals. The reversing switch K can be manually controlled. It can also be controlled by a relay coil that is in turn driven by means of receiving remote commands such as, for example, a receiver of radio-frequency commands. The reversing switch K can, if necessary, be incorporated in the actuator.

The actuator drives a load LD in a first direction DIR1 when the reversing switch K links the phase AC-H to the first phase terminal P1 and in a second direction DIR2 when the reversing switch K links the phase AC-H to the second phase terminal P2. However, the power supply of the motor MOT of the actuator is effective only if a controlled switch TR, disposed between the point N0 common to both windings W1 and W2 of the motor and the neutral conductor AC-N, is closed.

A control unit CPU is used to monitor the movement of the load LD and to cause the controlled switch TR to open in specific situations, for example when an abnormal or anticipated motor load variation occurs due to an unpredictable obstacle or a fixed end stop or even when the load arrives in a particular position stored in the control unit. The installation can, if necessary, include a load position sensor S linked to the control unit CPU. In the simplest devices, there is no position sensor, the position being able to be estimated by measuring the activation time of the motor if necessary. However, it is useful to have a measurement of the effort exerted by the load.

A motor capacitor CM is disposed between the two non-common ends of the windings W1 and W2 of the motor. The motor also includes an immobilizing brake and a reducing gear that are not shown to avoid overloading the figure.

The actuator also comprises two diodes D1 and D2 and a resistive circuit between the common cathode of these two diodes and the neutral conductor. The anode of the first diode D1 is connected to the first phase terminal P1 and the anode of the second diode D2 is connected to the second phase terminal P2. The resistive circuit comprises two resistors RA and RC mounted in series between the common cathode A and the neutral conductor. A single resistor would be sufficient in a variant where the voltage at the terminals of the capacitor is not measured or is measured differently. The electrical ground GND of the electronic circuit is chosen at the common point B of the resistors. If just one resistor R is used to form the resistive circuit, the ground GND is then connected to the neutral conductor.

The control unit CPU is powered by the voltage at the terminals of the resistor RA between the point A linked to the positive power supply terminal VDD and the ground GND linked to the negative power supply terminal VSS. The detail of the power supply, which comprises voltage lowering and regulating components, is not shown in the figures.

Two current sensors CS1 and CS2 are inserted into the circuit to detect a current flowing in the first diode D1 and a current flowing in the second diode D2. The output of the first current sensor CS1 is connected to a first logical input IN1 of the control unit CPU and the output of the second current sensor CS2 is connected to the second logical input IN2 of the control unit. Each current sensor switches the corresponding input to the high state when the corresponding diode conducts. The control unit CPU is thus able to identify the conducting or blocking state of each diode D1, D2.

The term "current sensor" should be understood to mean any means enabling the passage of a current to be detected in a branch in which the current sensor is inserted. The current sensor is preferably an optocoupler (for which the light-emitting diode serves as a sensor), but other semiconductor devices can also be used, such as a Hall-effect sensor. Similarly, the term "current sensor" should be understood here to mean any means enabling the conduction of a diode to be identified. Thus, a device for detecting a voltage above the conduction threshold of the diode and capable of transmitting this conduction information to an input of the control unit CPU is in this case a current sensor.

Figure 4:
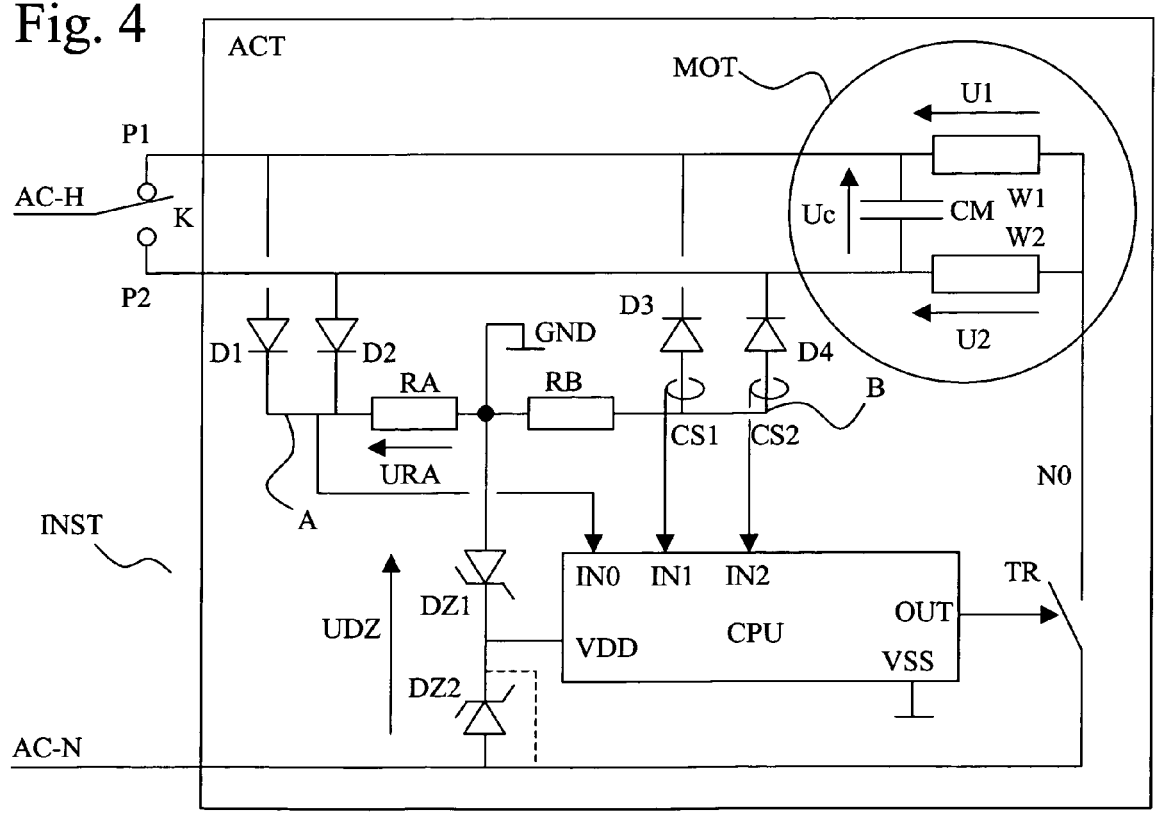
FIG. 4 is a diagram of a third embodiment of an actuator device according to the invention.

The actuator also includes two diodes D3 and D4, the common anode of which is linked to the point B. The cathode of the third diode D3 is linked to the first phase terminal P1 and the cathode of the fourth diode D4 is linked to the second phase terminal P2. Their role will be detailed below. In a preferred embodiment, the current sensors CS1 and CS2 detect not the currents flowing in the diodes D1 and D2 but the currents flowing in the diodes D3 and D4, as indicated in FIG. 4.

Any position information is obtained by a sensor S and transmitted to a third input IN3 of the control unit CPU, which moreover has a logical output OUT used to drive the controlled switch TR. This controlled switch is a relay, a triac or another semiconductor device.

Figure 2:
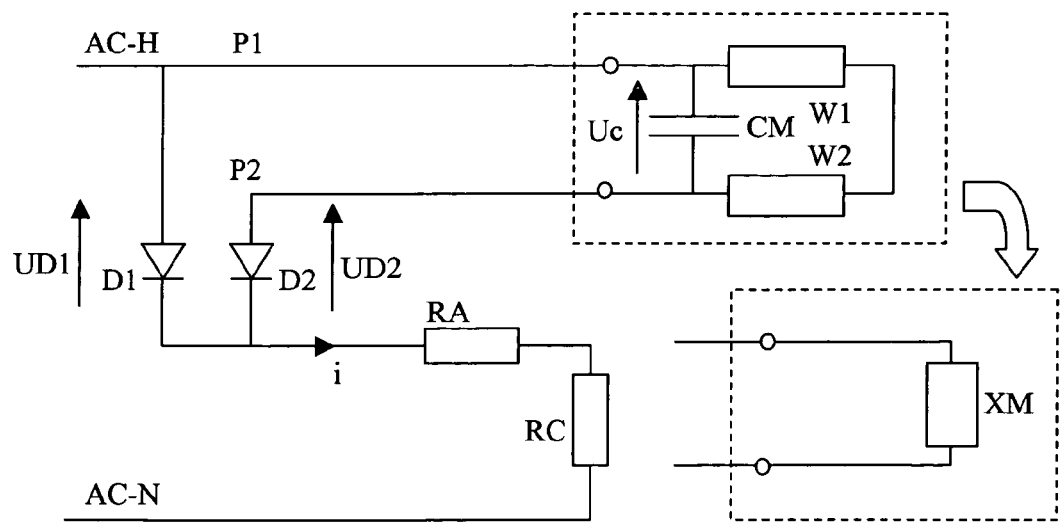
FIG. 2 is a simplified diagram of a first embodiment when the controlled switch is open.

FIG. 2 is a simplified electrical circuit diagram of the first embodiment of the actuator device when the controlled switch TR is open. The two windings W1 and W2 of the motor are then in series with each other and are in parallel with the motor capacitor C. All of the equivalent dipole XM is therefore either resistive and inductive, or resistive and capacitive.

When the phase conductor of the mains is connected to the first phase terminal P1 and when the mains voltage is positive, the current branch including the diode D1 short circuits the current branch including the equivalent dipole XM and the diode D2. In practice, if it is assumed that the diode D2 starts to conduct, the voltage UC at the terminals of the equivalent dipole is necessarily positive, therefore the voltage UD1 at the terminals of the diode D1 is greater than the voltage UD2.

Since the voltage UD1 is limited (typically 0.8 V), the result is that the more the diode D2 conducts, the more the voltage at its terminals should decrease, which is impossible. The diode D2 is therefore blocked. In other words, when the phase conductor of the mains AC-H is linked to the first phase terminal P1, then the first diode D1 conducts and the second diode D2 is blocked whereas when the phase conductor of the mains AC-H is linked to the second phase terminal P2, the second diode D2 conducts and the first diode is blocked. The detection of the diode that is conducting can therefore be used, at least when the controlled switch TR is open, to identify the control command applied to the actuator.

Figure 3:
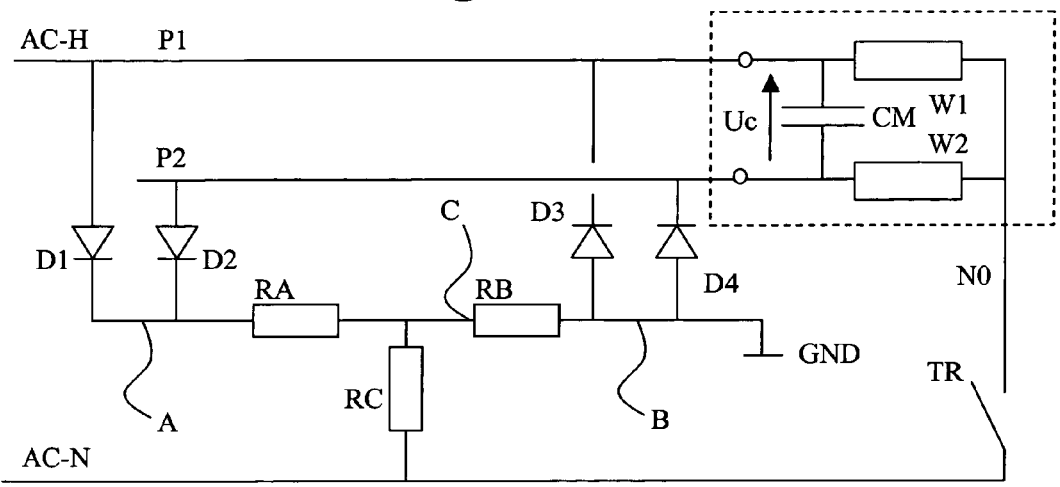
FIG. 3 is a simplified diagram of a second embodiment of an actuator device according to the invention.

FIG. 3 represents in simplified form a second embodiment of the actuator device in which the resistive circuit presents a T architecture between the points A and B and the neutral conductor. A resistor RB is now disposed between the point common to the resistors RA and RC of FIG. 1 and the point B identifying the common cathode of the diodes D3 and D4.

FIG. 4 represents a third embodiment of the actuator device in which the resistive circuit is also formed by a T between the points A and B and the neutral conductor. A resistor RB is disposed as previously. However, the resistor RC is replaced by two zener diodes DZ1 and DZ2 in opposition. In a variant of this third embodiment which constitutes the preferred embodiment of the invention, just one zener diode is used.

Figure 5:
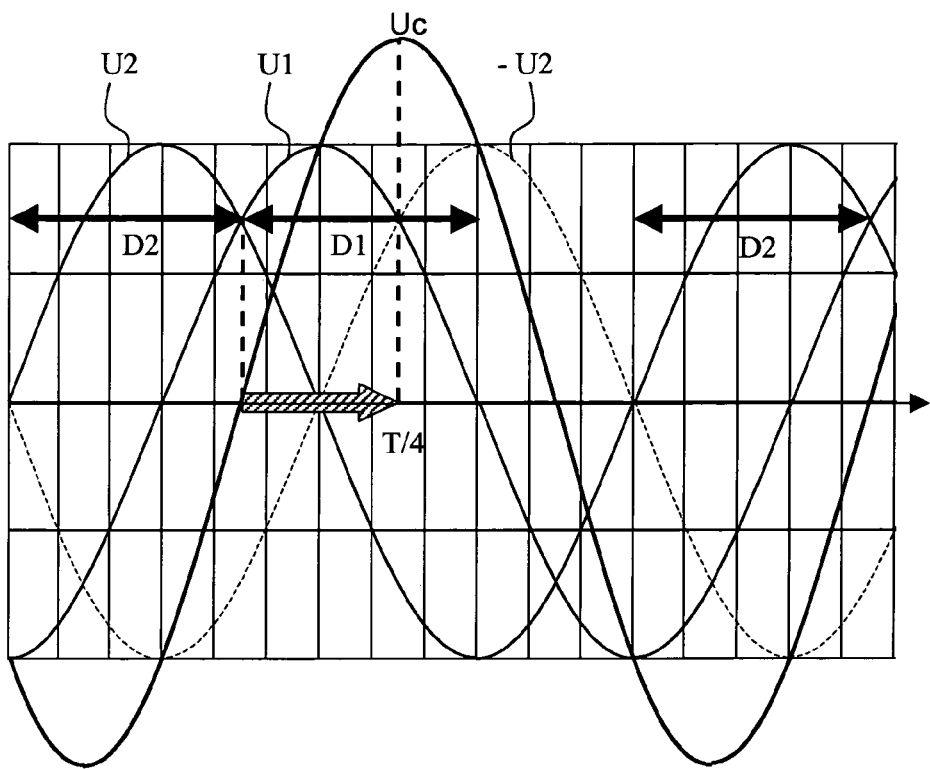
FIG. 5 is an oscillogram explaining the operation of the first embodiment of the device.

FIG. 5 represents an oscillogram over time of the voltages at the terminals of the windings of the motor and at the terminals of the motor capacitor CM in the case of a variant of the first embodiment represented in FIG. 1 in which there is no diode D3 and D4 and in the case where the control switch K links the phase conductor to the phase terminal P1 and the controlled switch TR is closed. The motor is therefore powered: the winding W1 is then main and the winding W2 is then auxiliary. This oscillogram corresponds to a steady state in which the motor is in nominal operating conditions. The voltages U1 and U2 at the terminals of the two windings are then equal in amplitude and phase shifted by a quarter period (90°). The auxiliary voltage U2 is leading the main voltage U1. The voltage at the terminals of the capacitor UC is given by:

$$UC=U1-U2$$

In FIG. 5, the voltage −U2 is represented by dotted lines so as to allow easy identification of the UC construction. Also shown by double arrows are the conduction periods of the first diode D1 and a second diode D2.

The diode D1 conducts when the main voltage U1 is both positive and greater than the auxiliary voltage U2. The diode D2 conducts when the auxiliary voltage U2 is both positive and greater than U1. It will be noted that the diode D2 conducts in this case before the diode D1 (or, to be more precise: the conduction of the diode D1 immediately follows that of the diode D2). This would be reversed if the reversing switch K were disposed in such a way as to establish the contact between the phase conductor AC-H and the second phase terminal P2. There is therefore also a means of identifying the position of the reversing switch K from the switching sequence of the diodes when the controlled switch TR is closed.

In all the cases, the or each conducting diode is identified using current sensors CS1 and CS2.

In FIG. 5, it will also be seen that when there is a switch from the diode D2 to the diode D1, the voltage UC is zero since this switching instant corresponds to the equality of the voltages U1 and U2. It is therefore sufficient to wait for a quarter period T/4 from this instant to measure accurately the voltage UC at the moment when it is maximum. Thus, the combination of a simple logical signal and a time counter allows this measurement, therefore saving the sampling needs of the microcontroller housed in the control unit CPU.

Generally, when the motor is progressively loaded, its speed reduces and the same applies for the amplitude of the auxiliary voltage and its phase shift relative to the main voltage. The latter are minimum when the powered motor is blocked in the off state. Conversely, they are maximum when the motor is rotating off-load.

Figure 6:
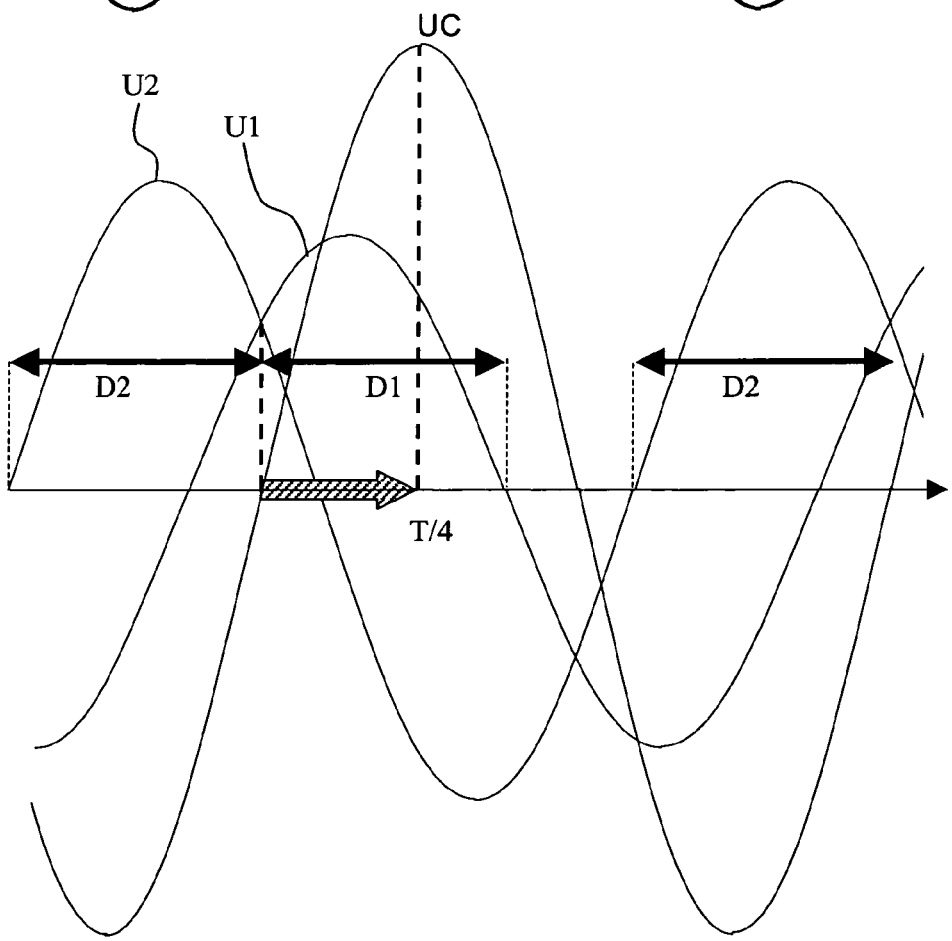
FIG. 6 is an oscillogram explaining the operation of the first embodiment of the device in the case where it is used off-load.

FIG. 6 corresponds to the case where the motor is used off-load. In this FIG. 6, the amount by which the auxiliary voltage U2 leads the main voltage U1 has increased compared to the conditions of FIG. 5 and the amplitude of the auxiliary voltage U2 has increased by 20%. This combination of effects significantly increases the amplitude of the voltage UC at the terminals of the capacitor, which is therefore particularly representative of the speed of the motor. Once again, it is sufficient to wait for a quarter period from the switching of the diodes D2 and D1 to measure the amplitude of the voltage UC.

The voltage UC can easily be measured using a small transformer, but this means would be costly and it is therefore preferable to use the complete assembly incorporating the diodes D3 and D4 and to measure the voltage at the terminals of the resistor RA.

Figure 7:
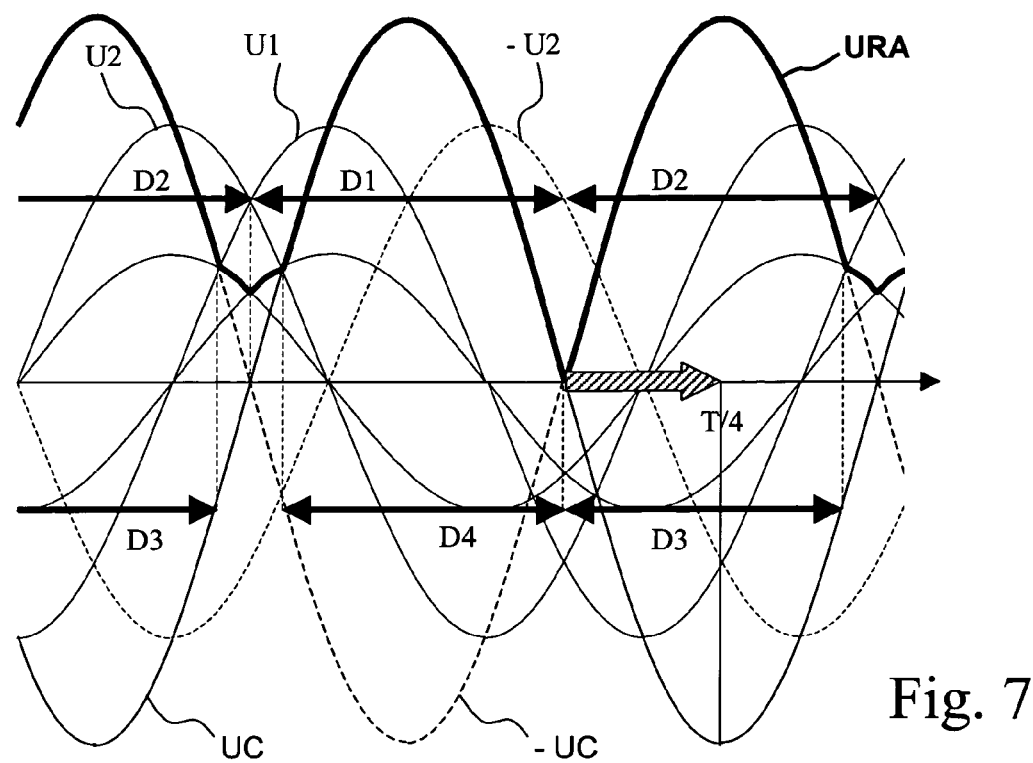
FIG. 7 is an oscillogram explaining the operation of the second embodiment of the device according to the invention.

FIG. 7 represents an oscillogram over time of the voltages at the terminals of the windings of the motor and at the terminals of the motor capacitor CM in the case of the first embodiment represented in FIG. 1 and in the case where the control switch K links the phase conductor to the phase terminal P1, the controlled switch TR is closed and the motor is operating in these nominal conditions. The voltage URA measured at the terminals of the resistor RA is represented by bold lines.

It should be noted that, if the resistor RC were not present, the voltage at the terminals of the resistor RA would quite simply be the full-wave-rectified voltage UC at the terminals of the capacitor CM. Such an assembly would make it possible to measure the amplitude of the voltage UC but not identify diode switching sequences, the conduction then being handled equally by the assembly D1-D4 and by the assembly D2-D3.

The two resistors RA and RC are assumed equal. A complete period reveals a number of operating bands. The analysis is started at the instantaneous instant of switching from the diode D2 to the diode D1 (the voltage U1 becoming greater than U2).

Since the diode D1 is conducting, the current in the resistor RA can circulate either simply in the resistor RC or both in the resistor RC and in the diode D4 depending on the value of the voltage U2 relative to half the voltage U1. The blocking of D4 is assumed. In these conditions, the voltage URC is half the voltage U1 since the resistors RA and RC are in this case equal. (In any case, the Thévenin generator would be taken to be equivalent to the voltage U1 and to all the resistors). As long as this voltage URC is less than the voltage U2, the diode D4 cannot conduct. The voltage URA is therefore half the voltage U1 until the moment where the voltage U2 becomes less than half the voltage U1. From this moment, the diode D4 becomes conducting. Since the conduction takes place simultaneously via the diode D1 and the diode D4, the voltage URA becomes equal to the voltage UC. This situation continues as long as the voltage U1 is greater than the voltage U2. At the instant when the voltage U2 becomes greater than the voltage U1, there is a simultaneous switching of the diodes D1, D2, D3 and D4. The diodes D2 and D3 turn on whereas the diodes D1 and D4 turn off. The voltage URA becomes equal to −UC.

However, the conduction of the diode D3 is assured only as long as the voltage URC off-load (or half the voltage U2) is greater than the voltage U1. When this condition is no longer satisfied, only the diode D2 conducts and the voltage URA is equal to half the voltage U2. Moreover, when the voltage U1 becomes greater than the voltage U2, the diode D2 turns off and the diode D1 turns on.

It is therefore apparent that, in this variant of the first embodiment, the diodes to be considered to establish the position of the reversing switch K from switching sequences are the diodes D3 and D4 and not the diodes D1 and D2. The switchings from the diode D1 to the diode D2 and from the diode D2 to the diode D1 are instantaneous and the switching from the diode D4 to the diode D3 is instantaneous whereas the switching from the diode D3 to the diode D4 is not. It can be concluded from this that the reversing switch links the phase conductor of the mains to the phase terminal P1 when there is instantaneous switching between the diode D4 and the diode D3 and links the phase conductor of the mains to the phase terminal P2 when there is instantaneous switching between the diode D3 and the diode D4.

The detection of the instantaneous switching between the diodes D4 and D3 is used to determine the moment at which the voltage UC is zero. It is also used to trigger a time counter which provokes the measurement of the voltage UC when a duration equal to a quarter of the mains voltage period has elapsed. It is then easy to deduce, from this measurement, the amplitude of the voltage UC and, consequently, the load to which the motor is subjected.

The device according to the invention lends itself to very many variants according to the respective positions of the resistors RA and RC (for example, the resistor RC can be located between the common anode of the diode D1 and D2 and neutral) and according to the choice of electrical ground. A T assembly with a third resistor RB can also be used, as represented in FIG. 3. The values and dispositions of the resistors are chosen to prevent a simple switching state occurring both between the diodes D1-D2 and between the diodes D3-D4. The sensors CS1 and CS2 are disposed on a pair of diodes presenting non-conduction periods.

FIG. 4 represents a highly interesting variant of a T assembly: the resistor RC is, at least partially, replaced by two zener diodes DZ1 and DZ2 in opposition in a first variant, by a single zener diode DZ1 in a second variant. Each zener diode is assumed to be ideal: the voltage at its terminals is zero when it conducts forward and this voltage is UZ when it conducts in reverse.

Figure 8:
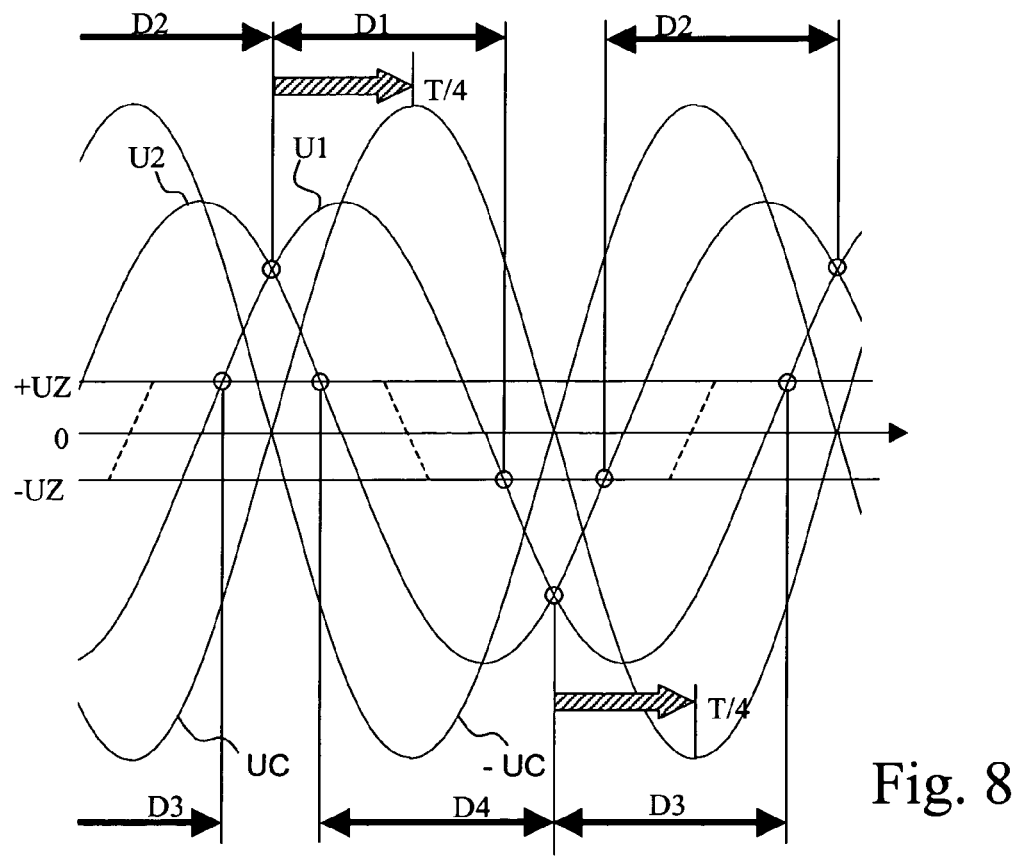
FIG. 8 is an oscillogram explaining the operation of a first variant of the third embodiment of the device according to the invention.

The oscillograms of FIG. 8 represent the voltages U1, U2 and UC in the case where two identical zener diodes and two identical resistors RA and RB are used.

When the diode D1 conducts, the current flowing through the resistor RA:
  is divided to flow through the set of diodes DZ1 and DZ2 and through the diode D4,
  or flows in full through the set of diodes DZ1 and DZ2, when the diode D4 is blocked,
  or flows in full through the diode D4 when the voltage of the Thévenin generator equivalent to the voltages U1, U2 and to the resistors RA, RB is less than the voltage UZ.

The diode D4 is blocked when the voltage U2 is greater than UZ.

When the diode D4 conducts, the current flowing through the resistor RB:
  originates from the set of diodes DZ1 and DZ2 and from the diode D1,
  or flows in full through the set of diodes DZ1 and DZ2, when the diode D1 is blocked,
  or flows in full through the diode D1 when the voltage of the Thévenin generator equivalent to the voltages U1, U2 and to the resistors RA, RB, is less than UZ.

The diode D1 is blocked when the voltage U1 is less than −UZ.

The voltage UDZ at the terminals of the set of the two zener diodes is −UZ when the zener diode DZ1 conducts in reverse and is +UZ when the zener diode DZ2 conducts in reverse. The voltage UDZ at the terminals of the set of the diodes DZ1 and DZ2 is represented by dotted lines in the non-conducting phases in the zener diodes. It will be noted in particular that this voltage UDZ is zero when the voltage UC is maximum. At this instant, the voltage URA is equal to half the voltage UC: it is therefore sufficient to measure the voltage URA a quarter period (T/4) after an instantaneous switching between the diodes D2 and D1 (or an instantaneous switching between the diodes D4 and D3) to have access to the amplitude of the voltage UC at the terminals of the capacitor.

A device according to a second variant of the third embodiment of the device differs from the device described previously in that the zener diode DZ2 is replaced by a short circuit (dotted line in FIG. 4). This time, the voltage UDZ is zero when the zener diode DZ1 conducts forward and −UZ when it conducts in reverse. This imbalance tends to shorten the conduction times of the diodes D3 and D4. The main interest of this variant is that the start and end of conduction instants of the diodes D3 and D4 are now linked to the instants at which the voltages U2 or U1 are cancelled out. In particular, the voltage U1 is maximum (amplitude of the mains voltage) a quarter period after the end of conduction of the diode D3. In the conduction range of the diode D1, URA=U1.

In other words, it is possible with the assembly of FIG. 4 without the diode DZ2:
  to identify the control command applied by means of the control switch by analyzing the instantaneous switchings between the diodes D4 and D3,
  to measure the amplitude of the voltage UC by measuring the voltage URA a quarter period after an instantaneous switching between the diodes D4 and D3,
  to measure the amplitude UMAX of the mains voltage by measuring the voltage URA a quarter period after the end of conduction of the diode D3 (if the control switch K is in position P1) or a quarter period after an end of conduction of the diode D4 (if the control switch K is in position P2),
  to control the controlled switch TR (a triac for example) in synchronism with the mains when there is a wish to supply the motor at reduced power or at reduced torque.

Alternatively, the measurement instants of the amplitude UMAX may be defined by the beginning of conduction of the diode D4 (if the controlled switch K is in position P1), or by the beginning of conduction of the diode D3 (if the controlled switch K is in position P2).

Whatever the method, the measurement of the amplitude UMAX is called "first measurement" but the word "first" has not a time meaning.

The terminal voltage of the resistor RB is equal to U1 when the diode D3 conducts (the voltage UDZ caused by the opposite conduction of the diode DZ1 is negligible). When the diode D2 also conducts, the terminal voltage of the series set of resistors RB and RA is equal to the voltage UC. With these conditions, the measurement of the voltage URA gives a value equal to the instantaneous difference (U1−UC) during all the time interval when there is simultaneous conduction of diodes D2 and D3 (left part of FIG. 9). A measurement done a quarter of period after the instant when the diode D3 begins to conduct gives the value of the voltage UC decreased by the voltage U1, that is to say, at this instant, 0.707 UMAX, since sin(T/4)=0.707. Indeed the voltage U1 is negative and its value is 0.707 UMAX, whereas the voltage—UC is positive and maximum. This measurement is called "second measurement" but the word "second" has not a time meaning.

The amplitude of the voltage UC can be accurately calculated using the second measurement and the first measurement. The result of the second measurement which includes a combined information regarding the voltages, since one is mainly interested in the amplitude variations of the voltage UC. If the voltage of the mains remains constant, the measurement dynamic will be better than in the case of a measurement of the whole voltage amplitude UC. If the tension of the mains varies, the variations have an effect on the two components of the composite voltage measured to the resistor RA terminals. The indirect measuring accuracy of torque is thus excellent.

It is thus possible to carry out only the second measurement without carrying out the first measurement.

It will be noted in FIG. 4 that the electrical ground GND is placed at the common point of the resistors RA and RB. The negative terminal VSS of the control unit CPU is connected to the ground GND, whereas the positive terminal VDD is connected to the cathode of the zener diode DZ1. The analog input IN0 is used to measure the voltage URA. The logical inputs IN1 and IN2 are connected to the current sensors CS1 and CS2 providing information on the conduction state of the diodes D3 and D4. The control unit CPU can, for example, comprise a microcontroller in a package with eight leads only.

Figure 10:
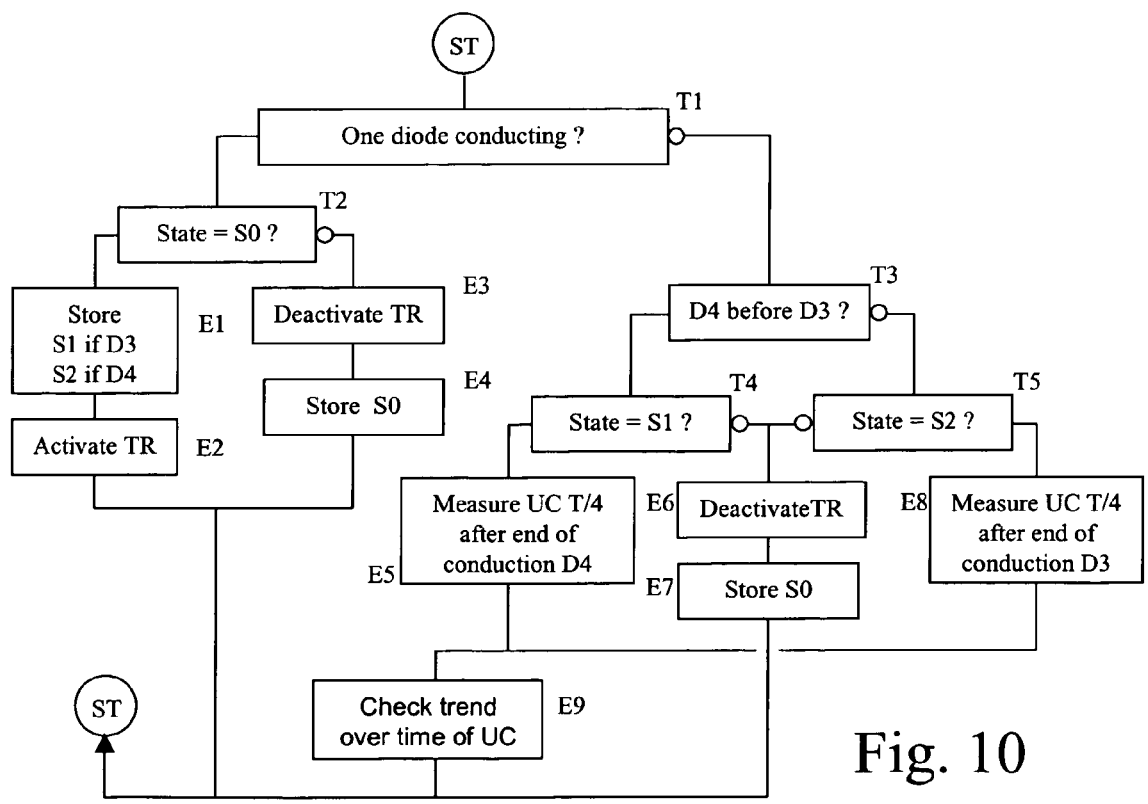
FIG. 10 is a flow diagram of a first way of executing the operating method according to the invention.

FIG. 10 describes both a first way of executing the method of identifying the control command, that is, the position of the control switch K, and the method of measuring the voltage of the motor capacitor CM. The way of executing the method is described assuming the configuration of FIG. 4 in which it is the instantaneous switching of the diodes D3 and D4 that is used to identify the position of the control switch K.

The method starts at the point ST. It is assumed that the actuator is in an idle state S0. An internal memory is used to store the current state of the actuator. In a first step T1, a test is run to check whether just one of the two diodes D3 and D4 is activated in each period.

If such is the case, the method goes on to a step T2 in which a test is carried out to check whether the present state of the actuator is the idle state S0. If it is, the method goes on to the steps E1 and E2 in which a new state S1 is stored in memory, corresponding to the rotation of the motor in the first direction or a new state S2 is stored in memory, corresponding to the rotation of the motor in the second direction, depending on whether a conduction of the diode D3 or of the diode D4 has been detected, then the controlled switch TR is closed. If not, there is a malfunction, the controlled switch TR is opened in a step E3, then the idle state S0 of the actuator is stored in memory in a step E4. Alternatively, a fault detection state SA can be stored in memory. After the steps E2 or E4, the method loops back to the point ST.

If, in the test T1, it is detected that the two diodes D3 and D4 are activated in each period, the method goes on to a test step T3 that is used to determine the instantaneous switching sequence between the diodes D3 and D4. If the instantaneous switching takes place from the diode D3 to the diode D4, the method goes on to a step T5. If it takes place from the diode D4 to the diode D3 (as in FIG. 9), the method goes on to a step T4. In these test steps T4 and T5, a check is run to ensure that the switching detected is consistent with the states stored in memory. If not, the controlled switch TR is opened in a step E6, then the idle state S0 of the actuator is stored in memory in a step E7. This case corresponds, in practice, to an abrupt change of the position of the control switch K1 relative to the preceding situation. It is consequently essential to stop the actuator to avoid jolts in the kinematic drive chain of the load.

If, in the step T4, the switching detected is consistent with the state stored in memory, the method goes on to the step E5 in which there is triggered, at the end of conduction of the diode D4 (or in an equivalent way, at the start of conduction of the diode D3), a time delay for a quarter mains period after which the voltage UC is sampled, for example from a measurement of the voltage URA. Similarly, if, after the step T5, the switching detected is consistent with the state stored in memory, the method goes on to the step E8 in which there is triggered, at the end of conduction of the diode D3 (or, in an equivalent way, at the start of conduction of the diode D4), a time delay of a quarter mains period after which the voltage UC is sampled.

The method then goes on to a step E9 for checking the trend over time of the voltage UC. This step can, if necessary, bring about the deactivation of the controlled switch TR if an abnormal speed variation is detected through variations in the voltage UC.

The method then loops back to the point ST.

The steps E5, E8 and E9 correspond more specifically to the method of measuring the capacitor voltage UC, whereas the other steps describe the method of identifying the control and of adapting the state of the actuator to this control.

The method is open to numerous variants, in particular in the case where the topology of the circuit leads to the use of diodes D1 and D2 to identify the state of the actuator.

Between the test steps T1 and T2, it is also possible to insert an intermediate test step aiming to detect a simultaneous conduction of the diodes D3 and D4. In practice, a simultaneous press on two control keys linking the phase terminals P1 and P2 to the phase conductor AC-H of the mains can constitute a particular control command or a programming command.

Finally, a variant of the method is also to measure the amplitude of the mains voltage, by measuring the voltage URA a quarter period after the end of conduction of the diode D3 (if the control switch K is in position P1) or a quarter period after the end of conduction of the diode P4 (if the control switch K is in position P2) in the case of the second variant of the third embodiment. This variant is deduced simply from what has already been seen. The knowledge of the mains voltage makes it possible to compensate for any variations in this voltage, which are reflected in the voltage UC and must not be interpreted as torque variations.

Thus, the block E9 for checking the trend over time of UC preferably uses a reduced variable equal to the ratio of the two voltages UC/Umains: this reduced variable is insensitive to variations in the mains voltage.

Figure 11:
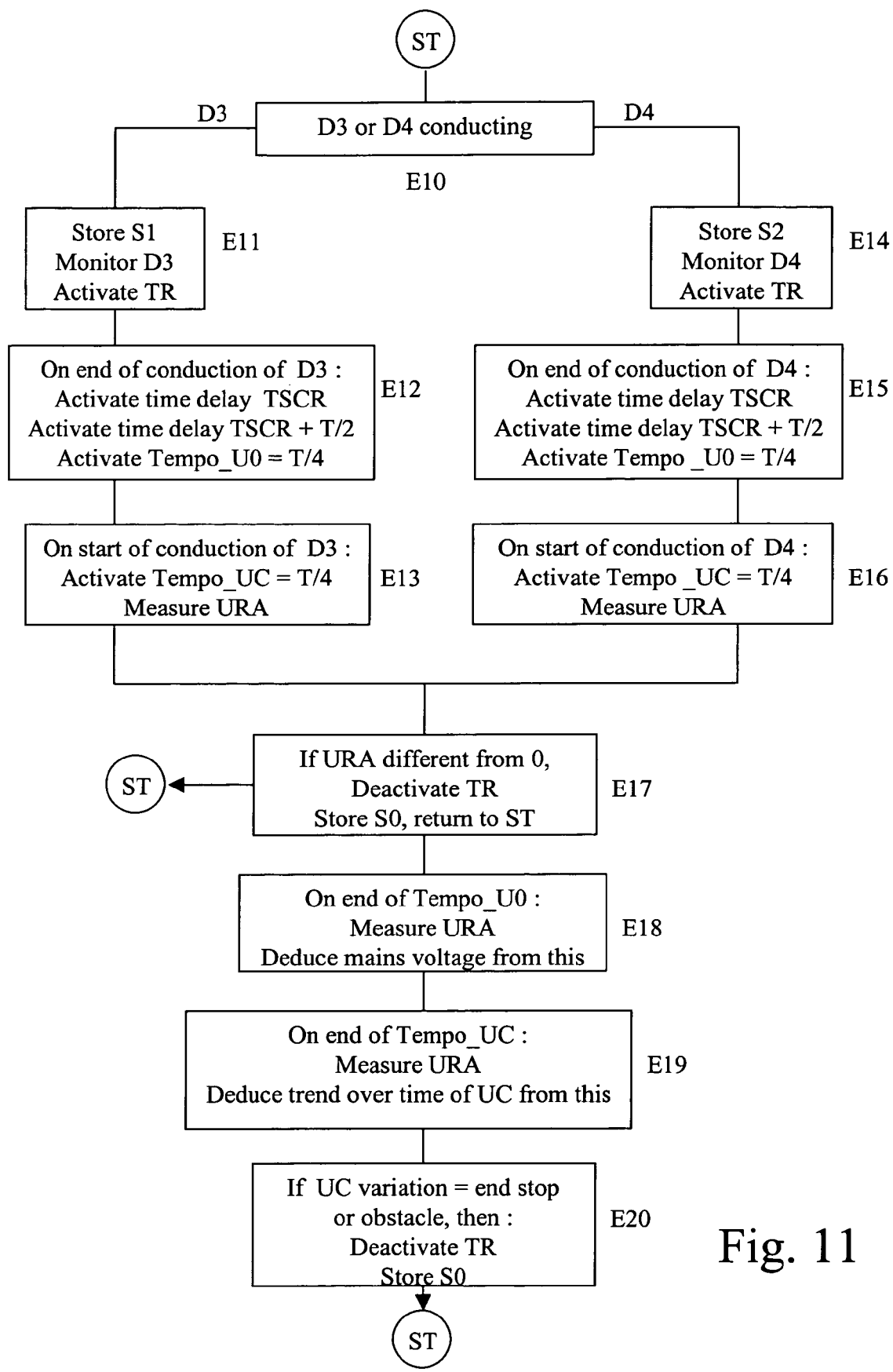
FIG. 11 is a flow diagram of a second way of executing the operating method according to the invention.

A second way of executing the method is described in FIG. 11. This way is simpler than the preceding method inasmuch as only the conduction of one diode is analyzed once the initial direction of the control has been determined. The method refers in particular to FIGS. 4 and 9.

The method starts at the point ST. The actuator is assumed to be initially in the idle state S0. A first test step E10 is used to determine if one of the diodes (D3, D4) is conducting. As long as no diode is conducting, the method loops on this test step. If the diode D3 is conducting, then the method goes on to the step E11 in which the state S1 is stored, corresponding to the rotation of the motor in the first direction DIR1. The method is then focused on monitoring the diode D3, for example, by allowing interruptions from the control unit on a rising or falling edge of the signal at the input IN1.

Figure 9:
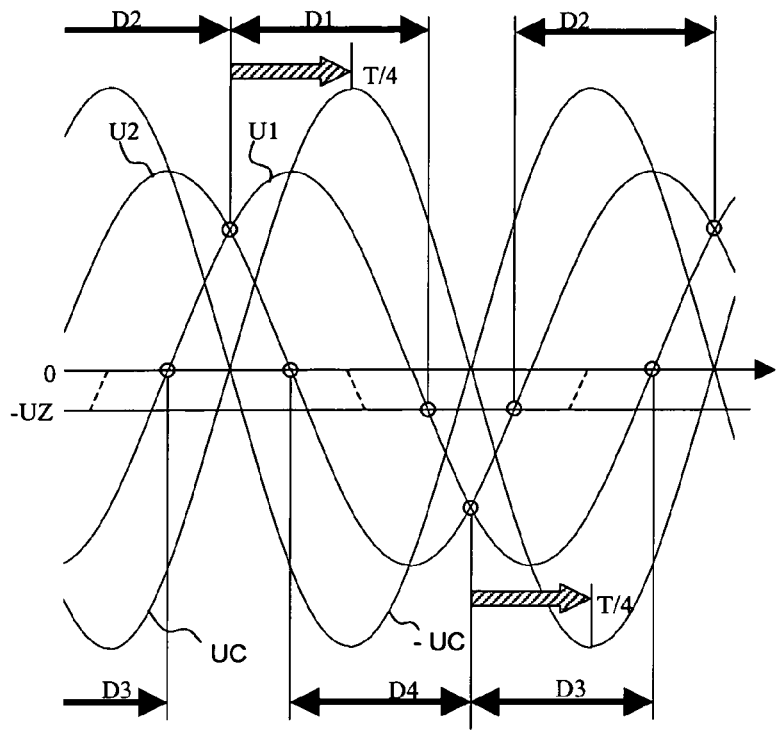
FIG. 9 is an oscillogram explaining the operation of a second variant of the third embodiment of the device according to the invention.

The controlled switch TR is activated and, because of this, the diode D4 starts to conduct in addition to the diode D3., as represented in FIG. 9 if the load conditions are nominal.

When an end of conduction of the diode D3 occurs, the method goes on to the step E12, the effect of which is to activate a time delay TSCR if necessary. In practice, as has been seen, the end of conduction of the diode D3 is used as a mains synchronization signal to activate, if necessary, an operation with partial chopping of the mains wave by the controlled switch TR. If the latter is of triac type, it is advantageous to provoke a first firing timed by the time delay TSCR and a second firing offset by a half period T/2 (10 ms at 50 Hz).

A second time delay TSCR+T/2 is then also activated. The detail of the triac control is known to those skilled in the art and is consequently not detailed any more here.

In the step E12, this end of conduction instant of the diode D3 is also used to activate a first measurement time delay, denoted Tempo_U0, of a duration equal to a quarter of the period T/4 of the mains voltage (5 ms at 50 Hz).

When, later, the diode D3 starts to conduct, this is necessarily a natural switching with the diode D4 which stops conducting (instantaneous switching). The method then, via the start of conduction edge of the diode D3, goes on to the step E13 in which a second measurement time delay is activated, denoted Tempo_UC, of a duration equal to a quarter of the mains voltage period T/4 (5 ms at 50 Hz).

In this step E13, the voltage URA is also measured. In practice, this voltage URA is normally zero at the moment when D3 starts to conduct. If such is not the case, an operation of the reversing switch K has just occurred, and it is essential immediately to stop the motor by opening the controlled switch TR. This test on the voltage URA and the corresponding action are carried out in the step E17. In the event of deactivation of the controlled switch TR and a return to the idle state, the state of the actuator is stored in memory and the method loops back to the point ST. Otherwise, the method goes on to a step E18 with the end of the first measurement time delay Tempo_U0. At this instant, a new measurement of the voltage URA is carried out. This measurement gives a value that can be used to determine the amplitude of the mains voltage. This value is stored in such a way as to be used in the step E19.

The method then goes on to a step E19, with the end of the second measurement time delay Tempo_UC. At this instant, a new measurement of the voltage URA is carried out. This measurement provides information on the amplitude of the voltage UC. It can therefore be used to analyze any variations in the amplitude of the voltage UC. The value of the voltage UC is corrected according to any variations in the mains voltage (as explained previously).

In a step E20, the variations over time of the voltage UC are analyzed, as absolute or relative value, or according to any method already known to those skilled in the art, to determine the presence of an end stop or any obstacle. For example, a strong decrease in the voltage UC is provoked by an end stop. In this case, the controlled switch TR is deactivated permanently and the actuator returns to the idle state S0.

The steps E14-E16 are provoked by the conduction of the diode D4 in the step E10. They are similar to the steps E11 to E13 except that it is the state S2 that is activated and that it is now the conduction of the diode D4 that will be used to determine the instants at which the actions must be undertaken.

The described methods apply in the same way when the controlled switch is closed in synchronization with the mains voltage, for example with a phase shift of 90° so as to obtain a reduced voltage. According to the phase shift value chosen, the measuring instant could be modified. For example, the measurement giving useful information regarding the composite voltage UC-U1 can be directly obtained at the instant of commutation between the diodes D4 and D3, when the phase shift is equal to 90°.

Figure 12:
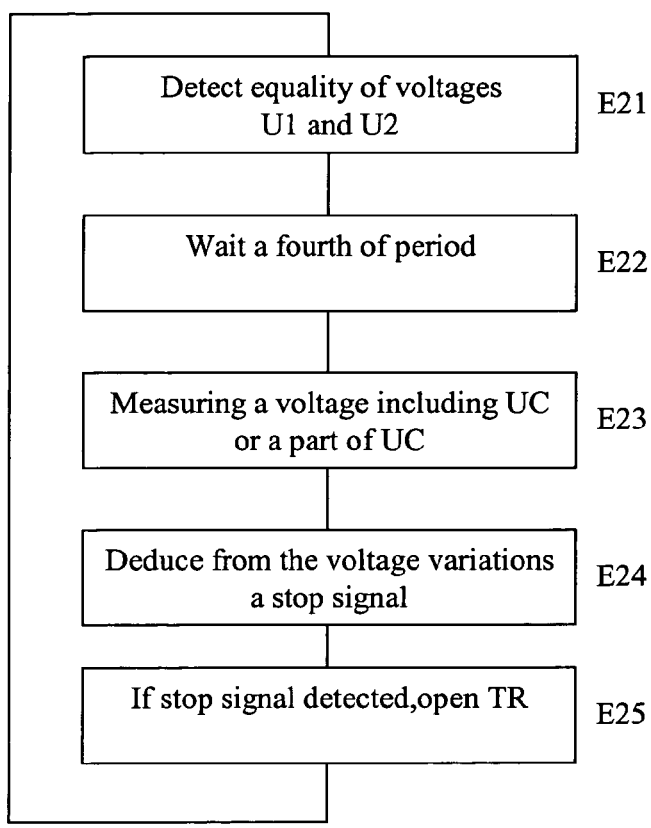
FIG. 12 is a flow diagram of a method for measuring the torque variations of a motor.

The invention can also apply if the control command does not have to be identified if its nature is known by other means that those described. In this case, the means of the invention remain useful for the measurement of the variations of the motor torque. One skilled in the art will be able to adapt the invention to any device allowing to identify undoubtedly a commutation by equality of the voltages U1 and U2, for example using comparators. The method for measuring the torque variations according to the invention is summarized by FIG. 12.

The method comprises a first step E21 of detecting the equality of the voltages, then a temporisation step E22 having a duration equal to a quarter of period and a step E23 of measuring the voltage thus occurring a quarter of period after the detection. The step of measuring relates to a composite voltage including a part or the whole voltage UC at the motor capacitor terminals.

In a step E24 of treatment, the variations of the composite voltage are analysed to deduce the presence of a stop signal. If such a stop signal is present, then a step E25 brings about the opening of the controlled switch TR, and the motor is no more supplied.

Figure 13:
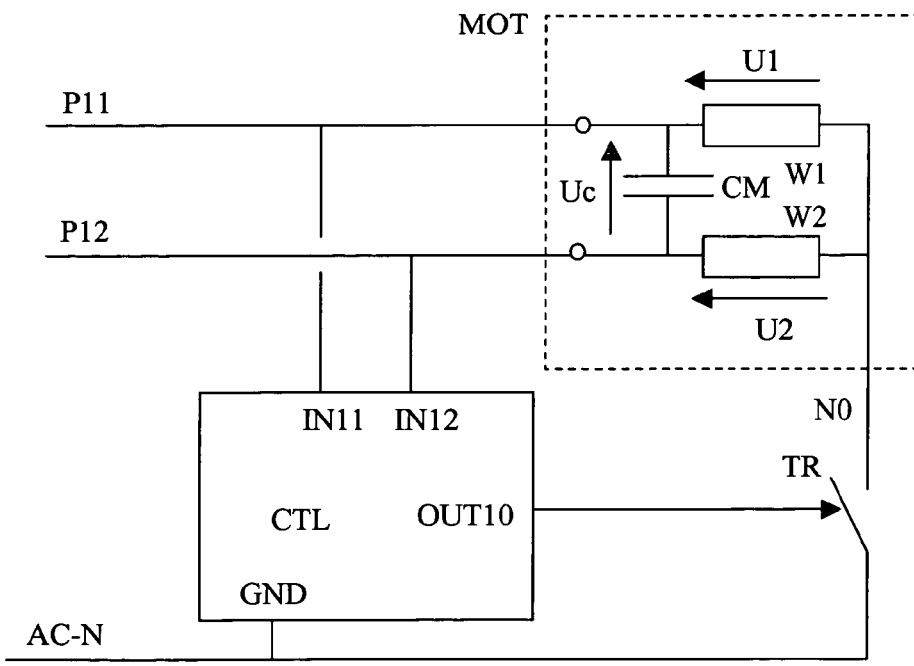
FIG. 13 is a diagram of a simplified embodiment of an actuator device according to the invention.

FIG. 13 represents a simplified device having a motor and which is supplied by two phase conductors P11 and P12 of which one or the other will be connected to the phase of the mains by an unspecified means (not represented). The motor includes as previously a first winding W1 and a second winding W2 having a common point N0, each noncommon end being connected to a terminal of the motor capacitor CM and to one of the phase conductors.

A control unit CTL is connected by a first entry IN11 to the first phase conductor P11 and by a second entry IN12 to the second phase conductor P12, and by a ground terminal GND to the neutral conductor AC-N, which itself is connected to the common point N0 by the controlled switch TR. This control unit allows not only the measurement of a simple voltage, between one of the entries and the ground, but also the measurement of a composed voltage, for example the differential voltage between the two entries (here the voltage UC). The exit OUT10 allows the control of the controlled switch TR.

The invention claimed is:

1. A method of operating an actuator (ACT) intended to be linked to a phase conductor (AC-H) and a neutral conductor (AC-N) of an alternating current voltage source, the actuator comprising:
a single-phase induction motor (MOT) provided with two windings (W1, W2) linked by one end (N0),
a permanent capacitor (CM) disposed between each of the other ends of the windings, and the terminals of which form a first phase terminal (P1) and a second phase terminal (P2), the phase conductor being connected to the first phase terminal to control the rotation of the motor in a first direction (DIR1) and to the second phase terminal to control the rotation of the motor in a second direction (DIR2), a switch (TR) controlled by an electronic control unit (CPU) to link the common end (N0) of the windings to the neutral conductor, at least one pair of diodes (D1, D2, D3, D4), the diodes of one and the same pair being connected by an electrode of the same type to a circuit that is at least resistive (RA, RC; RA, RB, RC; RA, RB, RC, DZ1, DZ2) connected to the neutral conductor, the other electrode of each diode being respectively linked to the first phase terminal and to the second phase terminal, and means (CS1, CS2) of detecting the state of conduction of each of the two diodes linked to the electronic control unit, wherein the switch is controlled by the state of the diodes, the method including a step for analyzing the state of conduction of the diodes to determine the state of the actuator and/or the nature of a control command and/or the amplitude of the voltage from the source and/or the amplitude of the voltage from the permanent capacitor and/or a signal driving the controlled switch.

2. The operating method as claimed in claim 1, wherein the step for analyzing the state of conduction of the diodes is used to determine whether the phase conductor is linked to the first phase terminal or to the second phase terminal.

3. The operating method as claimed in claim 1, which comprises a step for measuring directly or indirectly the voltage (UC) at the terminals of the permanent capacitor involving roughly a quarter period of the source voltage after an instantaneous switching between two diodes.

4. The operating method as claimed in claim 3, wherein the controlled switch is deactivated if a step for directly or indirectly measuring the voltage at the terminals of the capacitor occurring after an instantaneous switching between two diodes gives a substantially non-zero result.

5. The operating method as claimed in claim 1, which includes a step for measuring the voltage of the voltage source occurring roughly a quarter period of the source voltage after the end of the conduction of a diode without there being any switching with a second diode.

6. The operating method as claimed in claim 1, wherein the voltage measurements are performed at the terminals of one and the same element (RA) of the at least resistive circuit.

7. The operating method as claimed in claim 1, wherein the controlled switch is actuated in synchronism with the voltage source, the synchronization signal being determined by an end of conduction of a first diode, without instantaneous switching with a second diode.

8. An actuator (ACT) intended to be linked to a phase conductor (AC-H) and to a neutral conductor (AC-N) of an alternating current voltage source, and comprising:

a single-phase induction motor (MOT) provided with two windings (W1, W2) linked by one end (N0), a permanent capacitor (CM) disposed between each of the other ends of the windings and the terminals of which form a first phase terminal (P1) and a second phase terminal (P2), the phase conductor being connected to the first phase terminal to control the rotation of the motor in a first direction (DIR1) and to the second phase terminal to control the rotation of the motor in a second direction (DIR2), which comprises:

a switch (TR) controlled by an electronic control unit (CPU) to link the common end of the windings to the neutral conductor, at least one pair of diodes (D1, D2; D3, D4), the diodes of one and the same pair being connected by an electrode of the same type to a circuit that is at least resistive (RA, RC; RA, RB, RC; RA, RB, RC, DZ1, DZ2) connected to the neutral conductor, the other electrode of each diode being respectively linked to the first phase terminal and to the second phase terminal, and means (CS1, CS2) of detecting the state of conduction of each of the two diodes linked to the electronic control unit.

9. The actuator as claimed in claim 8, which includes two other diodes forming a rectifier bridge assembly, the input terminals of which are linked to the capacitor terminals and the output terminals of which power at least one first resistor (RA) disposed between the common anodes and the common cathodes of the diodes and which presents at least one electrical branch (RC; DZ1, DZ2) disposed between one of the ends of the first resistor and the neutral conductor.

10. The actuator as claimed in claim 9, which includes a means (CPU, IN0) of measuring the voltage at the terminals of the first resistor.

11. The actuator as claimed in claim 10, wherein the electrical branch includes a zener diode (DZ1, DZ2).

12. The actuator as claimed in claim 11, wherein the power supply terminals of the electronic control unit are linked to the terminals of the zener diode (DZ1).

13. The actuator as claimed in claim 8, wherein the electronic control unit presents software means for implementing the method as claimed in one of claims 1 to 7.

14. A method for measuring the torque variations of an induction motor comprising a main winding (W1), an auxiliary winding (W2) and a motor capacitor (CM), in an actuator for driving a load in a home automation installation, characterized in that it comprises a step of detecting of the instant when main winding terminal voltage and the auxiliary winding terminal voltage are equal and a step of measuring a voltage including at least the motor capacitor terminal voltage a quarter of period after the step of detecting.

15. An actuator including hardware means (CPU, IN1, IN2; CTL, IN1, IN2) and software means for the implementation of the method of claim 14.

* * * * *